United States Patent
Fontbonne

(10) Patent No.: US 10,307,010 B2
(45) Date of Patent: Jun. 4, 2019

(54) BEVERAGE PREPARATION MACHINE WITH FLEXIBLE DROP STOP

(71) Applicant: NESTEC S.A., Vevey (CH)

(72) Inventor: Luc Fontbonne, Lyons (FR)

(73) Assignee: Nestec S.A., Vevey (CH)

( * ) Notice: Subject to any disclaimer, the term of this patent is extended or adjusted under 35 U.S.C. 154(b) by 110 days.

(21) Appl. No.: 15/514,727

(22) PCT Filed: Sep. 28, 2015

(86) PCT No.: PCT/EP2015/072192
§ 371 (c)(1),
(2) Date: Mar. 27, 2017

(87) PCT Pub. No.: WO2016/050657
PCT Pub. Date: Apr. 7, 2016

(65) Prior Publication Data
US 2017/0215625 A1  Aug. 3, 2017

(30) Foreign Application Priority Data

Sep. 29, 2014  (EP) ..................................... 14186738

(51) Int. Cl.
*A47J 31/44* (2006.01)
*A47J 31/06* (2006.01)
(Continued)

(52) U.S. Cl.
CPC ....... *A47J 31/0605* (2013.01); *A47J 31/3604* (2013.01); *A47J 31/4428* (2013.01);
(Continued)

(58) Field of Classification Search
CPC .. A47J 31/4428; A47J 31/4425; A47J 31/467; A47J 31/369; A47J 31/3633
(Continued)

(56) References Cited

U.S. PATENT DOCUMENTS 8,124,150 B2 * 2/2012 Doglioni Majer .. A47J 31/3609
426/231

FOREIGN PATENT DOCUMENTS

DE    102004016194  *  5/2013  .......... A47J 31/3633
EP         2915465  *  9/2015  .......... A47J 31/3633
(Continued)

OTHER PUBLICATIONS

WO 2013/119538 (Smith et al.) Aug. 2013; A47J 31/3633.*

*Primary Examiner* — Reginald Alexander
(74) *Attorney, Agent, or Firm* — K&L Gates LLP

(57) ABSTRACT

A machine for dispensing a beverage (5) includes a beverage processing module (2) that has an outlet (20). The module (2) further has a first part (25) and a second part (26) that can be relatively moved between: a transfer configuration for introducing a beverage ingredient (4) between the first and second parts (25, 26) and/or removing the ingredient from therebetween; and a processing configuration for forming said beverage (5) from said ingredient (4) between the first and second parts (25, 26). The machine also includes:—a liquid driver (31) for driving a liquid along a liquid line (30) from a liquid source (32) via the processing module (2) to the outlet (20);—a drop collector (1) having a beverage guide (10) and a motor (11) for moving the guide (10) relatively to the outlet (20) into either a dispensing position for dispensing beverage (5) from the outlet (20) into a dispensing area (6) or a collecting position for dispensing residual beverage (5') from the outlet (20) into a service area (7);—a control unit (3) for controlling the liquid driver (31) and the motor (11, 11a, 11b); and a user-interface (3') for providing user-instructions to the control unit (3). The module (2) comprises a module actuator (21) for driving the first and second parts (25, 26) from the transfer configuration to the processing configuration and vice-versa, the actuator (21) being independent of the motor (11). The control unit
(Continued)

(3) is arranged to activate the liquid driver (31) and the motor (11) upon receiving a user-instruction from the user-interface (32) independently of a presence or an absence of a receptacle (60) in the dispensing area (6).

18 Claims, 6 Drawing Sheets

(51) Int. Cl.
*A47J 31/46* (2006.01)
*A47J 31/36* (2006.01)

(52) U.S. Cl.
CPC ............. *A47J 31/46* (2013.01); *A47J 31/467* (2013.01); *A47J 31/36* (2013.01); *A47J 31/3633* (2013.01); *A47J 31/44* (2013.01)

(58) Field of Classification Search
USPC .................. 99/289 R, 295, 302 P, 302 R
See application file for complete search history.

(56) References Cited

FOREIGN PATENT DOCUMENTS

| WO | 2006050769 | 5/2006 |
| WO | 2013127907 | 9/2013 |

\* cited by examiner

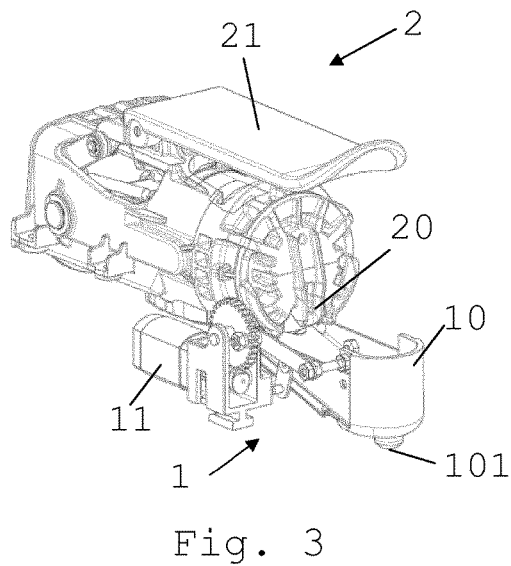
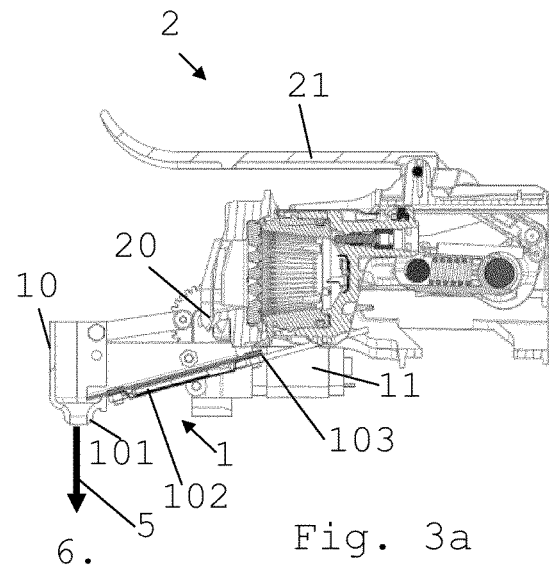
Fig. 3
Fig. 3a
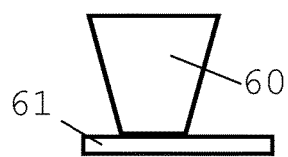
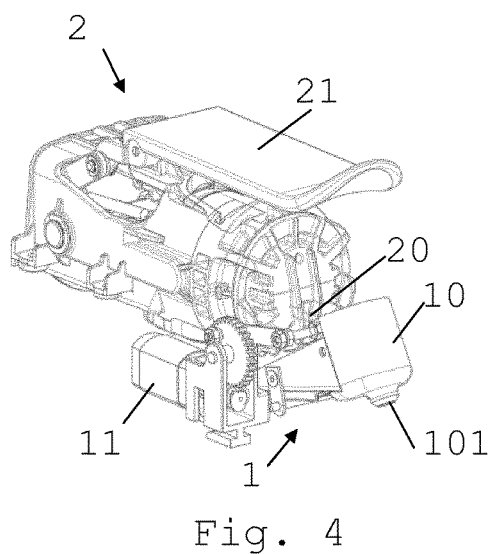
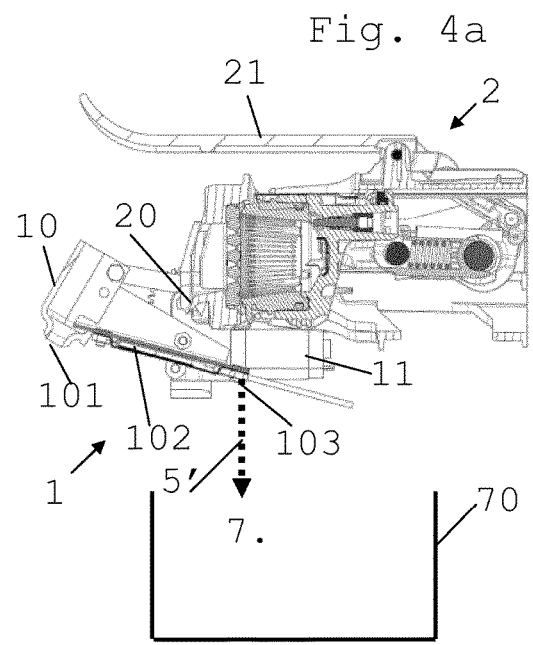
Fig. 4
Fig. 4a
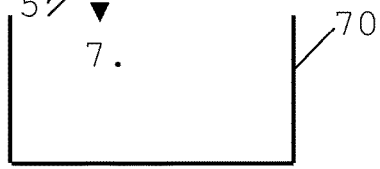

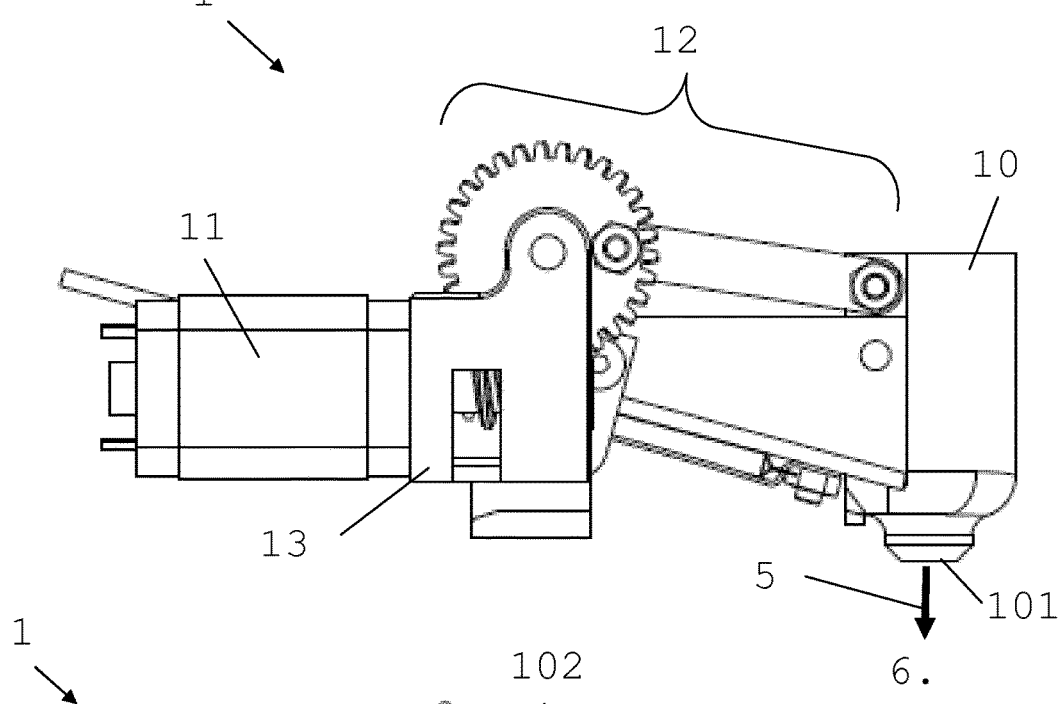
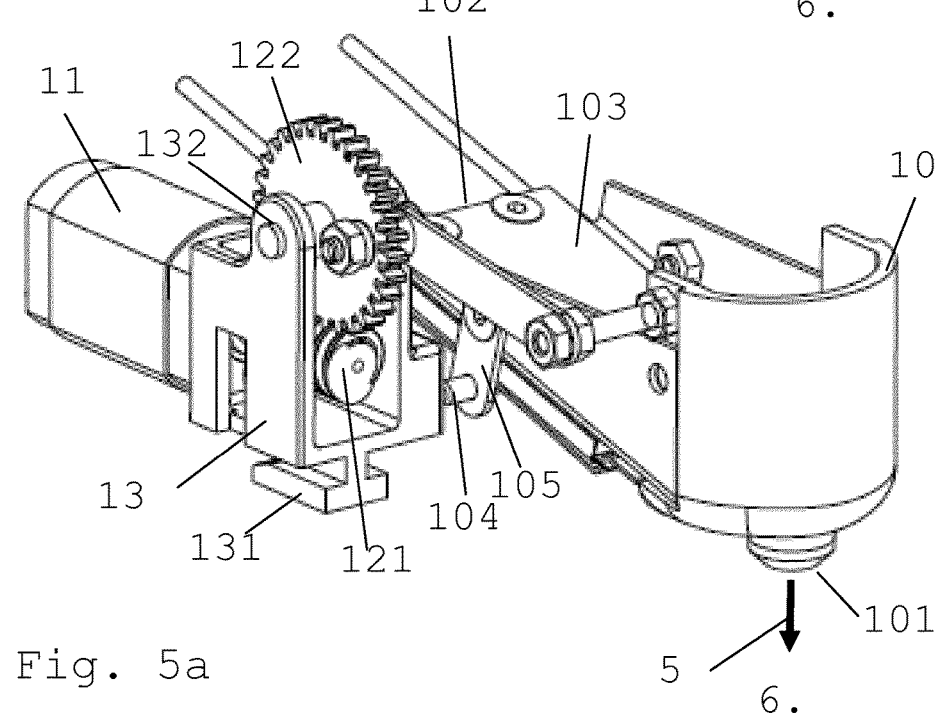

BEVERAGE PREPARATION MACHINE WITH FLEXIBLE DROP STOP

CROSS REFERENCE TO RELATED APPLICATIONS

The present application is a National Stage of International Application No. PCT/EP2015/072192, filed on Sep. 28, 2015, which claims priority to European Patent Application No. 14186738.2, filed on Sep. 29, 2014, the entire contents of which are being incorporated herein by reference.

FIELD OF THE INVENTION

The field of the invention pertains to beverage preparation machines, in particular using capsules of an ingredient of the beverage to be prepared, having an outlet for dispensing the beverage to a user-recipient in a dispensing area and an arrangement for preventing undesired dripping of beverage residues from such an outlet into the dispensing area, in particular after a beverage dispensing process and/or between beverage dispensing processes.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a boiler, a thermoblock or the like, a brewing unit in which an ingredient is brewed with water or a mixing unit in which ingredients are mixed together, and a beverage outlet for dispensing the prepared beverage. Typically, the beverage outlet is located above a beverage dispensing zone, e.g. above a grid for supporting a cup or other recipient under the outlet and for the passage of drops of liquid from the beverage outlet or other spills into a collector tray located under the grid.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water. Drip tray devices with cup supports are well known in the art. There are also such devices that are further arranged for allowing the adjustment of the vertical position under the beverage outlet of cups of different sizes. Examples of arrangements in this field are disclosed in CA 2,260,352, EP 0 549 887, EP 1 731 065, EP 1 867 260, FR 2 439 042, U.S. Pat. No. 5,161,455, 5,353, 692, WO 2009/074557.

WO 2012/072758 and WO 2013/127907 disclose beverage machines having a beverage guide located downstream an ingredient processing module that includes a first beverage path to a serving locating and a second beverage path to a service location. The module has a downstream part that is movable between an ingredient processing position and an ingredient insertion/evacuation position, the downstream part being coordinated with the beverage guide so that the beverage is directed to the service location when the downstream part in in the ingredient insertion/evacuation position and to the serving location when the downstream part is in the ingredient processing position. To reliably stop the dripping to the serving location at the end of the ingredient processing, the downstream part should be brought to the ingredient insertion/evacuation position at the end of beverage serving. Such an improved operation thus requires an automatic actuation of the downstream part controlled by the machine and thus a motorization or other automatic actuation of the downstream part is desirable or at least an advantage.

WO 2006/050769 discloses a beverage preparation machine with a vertically movable cup support located under the machine's beverage outlet and a drop collector arm that is pivotable under the beverage outlet for collecting drops upon beverage dispensing. The drop collector is motorized and automatically moved away from the beverage outlet when a cup is detected under the outlet by a dedicated sensor and is moved back when the beverage processing is stopped. The electric motor of the collector is controlled by a controller connected to this cup sensor which controls also the beginning and a premature end of the beverage preparation and dispensing (due to an early removal of the cup). In an alternative embodiment, the drop collector is simply pushed out of the collecting position by a cup placed under the outlet and allowed back to the collecting position by the removal of the cup (mechanical cup sensor and drop stop actuation). In a further embodiment it is suggested to actuate the drop collector via the machine's pump hydraulically instead of electrically (coordination of the drop collector with the activity of the pump).

To avoid the use of a drop collector and corresponding actuation thereof between a collecting configuration and a dispensing configuration, it has been proposed in WO 2011/067264 to release the pressure upstream the beverage outlet and beverage preparation unit via a deviation valve so that evacuation of the residual pressurised liquid in the machine via the beverage outlet is minimised.

SUMMARY OF THE INVENTION

An object of the invention is to address at least some of the drawbacks of the prior art drop management systems or at least to provide an alternative thereto.

The invention relates to a machine for dispensing a beverage. The beverage preparation machine can be an in-home or out of home machine. The machine may be for the preparation of coffee, tea, chocolate, cacao, milk, soup, baby food, etc. . . . The machine may be arranged for preparing within a beverage preparation module a beverage by passing hot or cold water or another liquid through a capsule containing an ingredient, such as a flavouring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, caf latte, americano coffees, teas, etc. . . . . In particular, a coffee machine may be configured for dispensing espressos, e.g. an adjustable volume of 20 to 60 ml per serving, and/or for dispensing lungos, e.g. a volume in the range of 70 to 150 ml per serving.

The machine may include a (stationary) frame and/or housing in which and/or to which the machine's components, e.g. the components mentioned below, are assembled. Exemplary beverage preparation architectures are for instance disclosed in WO 2009/074550 and WO 2009/130099.

The machine includes a beverage processing module that has an outlet. The module further includes a first part and a second part that can be relatively moved between:
- a transfer configuration for introducing a beverage ingredient between the first and second parts and/or removing the ingredient from therebetween; and
- a processing configuration for forming the beverage from the ingredient between the first and second parts.

Typically, the formed beverage is dispensed via the module's outlet.

For instance, the module is assembled to a machine's frame and/or housing. For example, a fixed part of the module, e.g. a fixed first part or a fixed second part of a fixed module frame carrying the first and second parts, is assembled to such a machine's frame and/or housing.

In an embodiment, the ingredient is supplied within a capsule to the module. Such a capsule may have a container covered by a lid e.g. a container and/or a lid extending radially to form a flange.

In the processing configuration, the processing module may form an ingredient chamber for containing the ingredient or an ingredient holder for holding the ingredient, e.g. when the ingredient is supplied within a capsule that forms itself an ingredient chamber. The processing module may form an ingredient chamber for containing the ingredient supplied within a capsule so that beverage processing a module chamber encloses.

Examples of ingredient preparation modules are described in WO 2007/135135, WO 2009/043630 and WO 2011/042400.

The processing module can be configured to process a capsule containing the beverage ingredient. The module, e.g. an ingredient chamber thereof, may comprise or may be associated with at least one capsule opener, such as at least one of: one or more puncturing and/or tearing elements; and one or more pins and/or blades, such as a capsule piercer or tearing plate, e.g. as known from EP 0 512 468, EP 0 512 470, EP 1 299 022, EP 1 339 305, WO 2013/026845, WO 2014/076041, PCT/EP14/067284, PCT/EP14/067286 and PCT/EP14/067287.

Typically, the module's first and second parts include an inlet for letting a liquid, e.g. water, to the ingredient to be mixed therewith. The inlet may be formed on the first part and the outlet may be formed on the second part or vice versa. The inlet and the outlet can be formed on the same part.

The machine further includes a liquid driver, such as a pump, for driving a liquid, e.g. water, along a liquid line from a liquid source, such as a liquid reservoir, via the processing module. Examples of pumps in beverage machines are disclosed in WO 2006/005425, WO 2009/024500, WO 2009/150030, WO 2010/108700 and WO 2011/107574, The liquid may be driven to the outlet via a thermal conditioner such as a heater and/or a cooler.

A suitable heater may be a boiler, a thermoblock or an on demand heater (ODH), for instance an ODH disclosed in EP 1 253 844, EP 1 380 243 and EP 1 809 151. Other heaters are disclosed in WO 2009/043851, WO 2009/043865, WO 2009/092746 and WO 2011/157675 and WO 2012/007260.

The machine also comprises a drop collector having a beverage guide and a motor for moving the guide relatively to the outlet into:
- a dispensing position whereby the beverage flowing from the outlet is delivered to a receptacle in a dispensing area during a beverage serving, optionally the drop collector diverting the beverage flowing from the outlet to the dispensing area; and
- a collecting position whereby residual beverage flowing from the outlet is delivered to a service area after a beverage serving, optionally the drop collector diverting the residual beverage flowing from the outlet to the service area.

The drop collector may be assembled to a machine's frame and/or housing. For instance, the drop collector may be assembled to such a frame and/or housing, directly or indirectly, via the motor and/or via the beverage guide that is mounted via a bearing element (e.g. a pivoting system or a translational system).

The dispensing area can be delimited by a receptacle support. Typically the support includes a support surface for positioning a user-recipient, e.g. a mug or a cup, to collect the dispensed beverage. The support surface may be formed by a support member that is part of the machine or may be a virtual surface, e.g. the surface of a table on which the machine is placed. Examples of such support surfaces for user-recipients are disclosed in EP 1 867 260, WO 2009/074557 and WO 2013/104636.

The service area may be delimited by a removable receptacle, e.g. located with a machine's frame and/or housing. The removable receptacle can be a waste collector, such as a waste material tank or reservoir. Examples of such collectors are disclosed in EP 1 867 260, WO 2009/074557, WO 2009/074559, WO 2009/135869, WO 2011/086087 and WO 2011/154492. Typically, the waste collector is configured for collecting at least one of: one or more waste beverage ingredients, such as a used flavouring ingredient and/or waste water; one or more used capsules for supplying a beverage ingredient into said machine; and a cleaning agent, such as a cleaning, rinsing or descaling liquid.

The drop collector's motor can be a rotary motor or a linear motor or an electro-mechanical solenoid e.g. cooperating with a return spring.

Hence, the drop collector can allow a flow of liquid from the outlet to an area for dispensing the liquid e.g. into a user-receptacle (e.g. a cup or a mug), or to a different area used for servicing the machine, e.g. a service area associated with a removable receptacle for collecting waste, such as residual beverage, used ingredient and/or a cleaning fluid upon use.

The drop collector can either divert the flow towards the service area and/or towards the dispensing area. The drop collector may also be arranged to not interfere with the flow from the outlet either to the service area or to the dispensing area when the machine is configured so that liquid flowing from the outlet automatically reaches either the service area or dispensing area in the absence of any drop collector.

For instance, the collector's guide can have a dispensing opening from which the beverage is dispensed to the dispensing area and/or a service opening from which the beverage residues are drained and delivered to the service area.

The machine further includes a control unit for controlling the liquid driver and the motor and optionally (when present) a thermal conditioner. The machine also comprises a user-interface for providing user-instructions to the control unit. Typically, the control unit is mounted to a machine's frame and/or housing and connected to the liquid driver, the motor, the (optional) thermal conditioner and possibly other components such as sensors (e.g. a temperature sensor or a flowmeter) via flexible or preferably rigid connections. Examples of control units and user-interfaces are disclosed in WO 2008/138710, WO 2009/043851, WO 2009/043865, WO 2009/092745, WO 2010/003932, WO 2010/037806, WO 2010/046442, WO 2011/020779, WO 2011/026853, WO 2011/054889, WO 2011/067156, WO 2011/067157, WO 2011/067181, WO 2011/067188, WO 2011/067191, WO 2011/067227, WO 2011/067232, WO 2011/144719, WO 2012/032019, WO 2012/072761, WO 2012/072764, WO 2012/072767 and WO 2012/093107.

The processing module includes a module actuator for driving the first and second parts from the transfer configuration to the processing configuration and vice-versa. This module actuator is independent of the abovementioned motor. In other words, the module actuator does not depend on the output of the motor. Typically, the module actuator is directly or indirectly mounted to a machine's frame and/or housing.

In accordance with the invention, the control unit is arranged to activate the liquid driver and the motor upon receiving a user-instruction from the user-interface independently of a presence or an absence of a receptacle in the dispensing area.

It follows that the position of the drop collector's guide can be set independently of the configuration of the processing module and of the presence or absence of any particular type of receptacle on the dispensing area. Consequently, the circulation of liquid to the collecting area and to the dispensing area can be optimally adjusted according to any particular need. For instance, when a cleaning process is carried out with the processing unit in its processing configuration, it is possible to direct the cleaning fluid into the service area whether or not any receptacle is present in in the dispensing area (hence, the machine can be configured so that the presence of a cleaning or rinsing fluid collector on the dispensing area can be avoided to collect such fluids upon use). It is possible to align the position of the drop collector's guide in line with the beginning and the end of the ingredient processing and beverage dispensing or with an interference of the processing (e.g. early termination of the processing).

The control unit can be arranged to activate the liquid driver and the motor independently of the configuration of the processing module.

The control unit may be arranged to activate the liquid driver and the motor only when the processing module is in the processing configuration.

The control unit can be configured to simultaneously or within a time span of less than 5 sec., such as less than 3 sec.:
  activate the liquid driver and the motor to relatively move the beverage guide into the dispensing position, such as activate the motor prior to activating the liquid driver; and/or
  deactivate the liquid driver and activate the motor to relatively move the beverage guide into the collecting position, such as deactivate the liquid driver prior to activating the motor.

The beverage guide can be provided with a thermal conditioner such as a cooler or a heater, e.g. a thick film, discrete resistor or cartridge heater, for instance a thermal conditioner controlled by the control unit. The thermal conditioner may be configured to adjust a temperature of the beverage when delivered to the dispensing area.

The control unit can be configured to deactivate the liquid driver and activate the motor to move the beverage guide relatively to the outlet into the collecting position at:
  user-actuation of the user-interface or user-actuation of the module actuator, while the liquid driver is active; or
  at expiry of a predetermined period of time after user-actuation of the user-interface for activation of the liquid driver.

The module actuator may be semi-automatic, such as a module actuator comprising an energy buffer, e.g. a spring, that is loaded in one direction and unloaded in an opposite direction when the first and second parts are relatively driven between the transfer configuration and the processing configuration.

The module actuator can be fully automatic, such as a module actuator comprising an energy converter, for instance a converter into mechanical energy of electric and/or hydraulic energy such as an electric motor and/or a hydraulic actuator e.g. powered via the liquid driver. Optionally, the actuator is controlled by the control unit. Examples of such actuators are disclosed in The module actuator can be manual, such as a module actuator comprising a handle, e.g. a pivotable and/or a translatable handle, that can be driven manually by a user. In an embodiment, the actuator drives the first part and/or the second part via a transmission such as a transmission comprising a gear arrangement and/or a lever arrangement, e.g. a transmission that is assisted by an automatic return spring.

Examples of module actuators and their control and transmissions can be found in EP 1 767 129, WO 2005/004683, WO 2007/135135, WO2007/135136, WO 2011/042400, WO 2011/042401, WO 2012/025258, WO 2012/025259, WO 2012/093108, WO 2014/056810, WO 2014/056862, WO 2014/096121, EP2014163793 and EP2014163810 and the references cited therein.

The beverage guide may have at least one directing surface for collecting beverage from the outlet either to the service area or to the dispensing area. The directing surface can be formed of:
  a single ramp such as a ramp pivotable relative to the outlet; or
  at least two joined ramps such as ramps translatable relatively to the outlet, e.g. a collecting ramp and a dispensing ramp; or
  at least two spaced apart ramps such as a dispensing ramp and a collecting ramp, for instance a collecting ramp relatively movable to the dispensing ramp and to the outlet, e.g. movable by translation and/or rotation.

The beverage guide can be moved by the motor via a transmission. For instance, the transmission includes:
- a gear arrangement such as a toothed gear arrangement, e.g. an arrangement comprising at least one of a wheel, pinion, rack and worm gear; and/or
- one or more connecting rods, such as a connecting rod driven by or driving a wheel and/or a pair of connecting rods forming a knuckle joint.

When the motor is an electromechanical solenoid, a mechanical transmission is not required and optional. The beverage guide, e.g. made of or comprising an iron or another magnetically responsive member, can be driven directly by a magnetic flux generated by the electromechanical solenoid.

The outlet may be fixed, at least part of the beverage guide being movable relative to the fixed outlet, the outlet extending for instance from a fixed part of the beverage processing module.

The outlet can be movably arranged. At least a part of the beverage guide can be movably arranged or the beverage guide is fixed. For instance, the outlet extends from a movable part of the beverage processing module or is connected via a dimensionally flexible connector, e.g. a flexible tube, to a movable or a fixed part of the module.

At least a part of the beverage guide can be pivotable relatively to the outlet, e.g. pivotable about a generally horizontal axis.

At least a part of the beverage guide can be translatable relatively to the outlet, e.g. translatable along a generally horizontal axis.

Generally speaking the beverage guide can be: movable and the outlet is fixed; or fixed and the outlet is movable; or movable and the outlet is movable.

BRIEF DESCRIPTION OF THE DRAWINGS

The invention will now be described with reference to the schematic drawings, wherein:

FIGS. 3 and 3a illustrate part of the beverage machine of FIGS. 1 and 1a in which the processing module is in its processing configuration and the drop collector's guide is in its dispensing position;

FIGS. 4 and 4a show part of the beverage machine of FIGS. 1 and 1a in which the processing module is in its processing configuration and the drop collector's guide is in its collecting position;

FIGS. 5 and 5a are side and perspective views of the drop collector of the beverage machine of FIGS. 1 and 1a with the guide in its dispensing position;

DETAILED DESCRIPTION

The following description in connection with the appended figures illustrate, partly in detail and partly schematically, four different non-limiting embodiments of machines according to the invention.

Figure 8A:
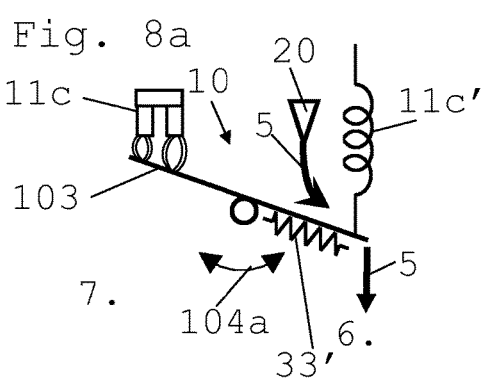
FIGS. 8a and 8b schematically illustrate the operating principle of another drop collector of a machine according to the invention.
Figure 9A:
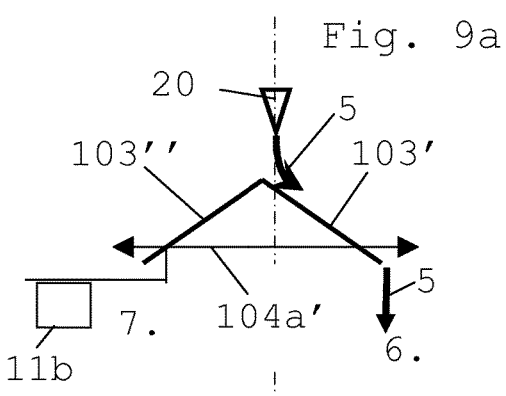
FIGS. 9a and 9b schematically illustrate the operating principle of a further drop collector of a machine according to the invention.
Figure 8B:
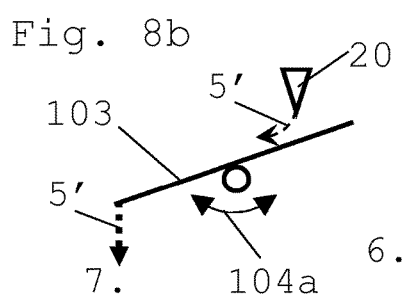
Figure 9B:
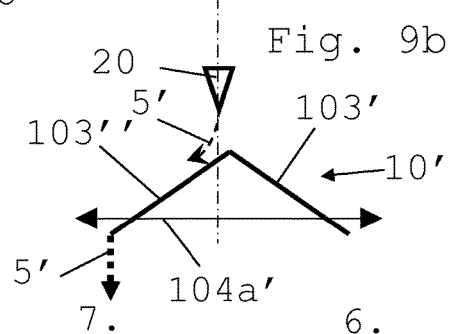
Figure 10A:
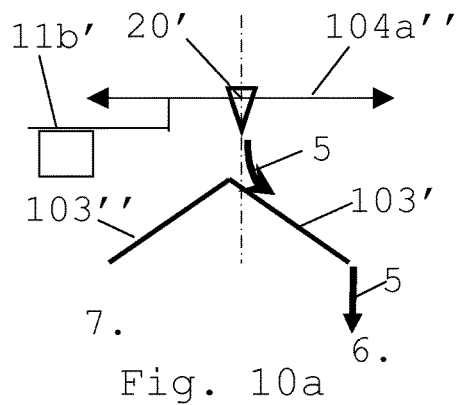
FIGS. 10a and 10b schematically illustrate the operating principle of yet a further drop collector of a machine according to the invention.
Figure 10B:
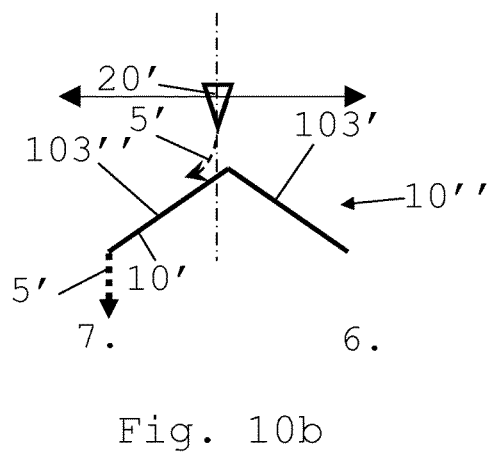
Figure 11A:
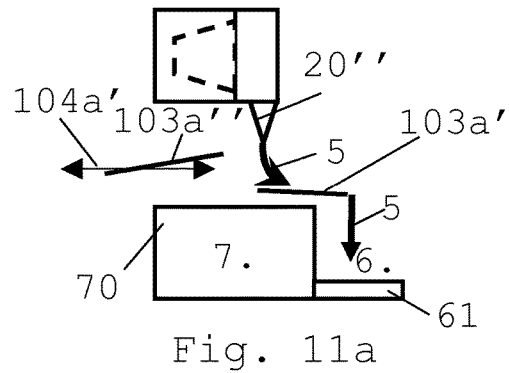
FIGS. 11a, 11b and 11c schematically illustrate the operating principle of yet another drop collector of a machine according to the invention.
Figure 11B:
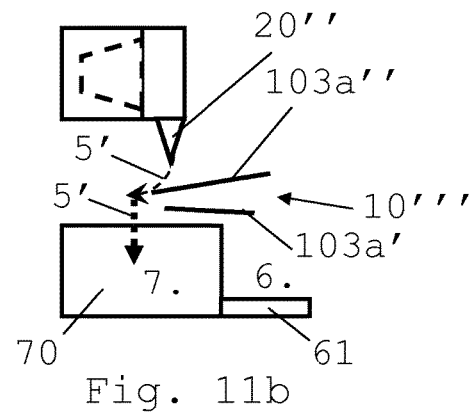
Figure 11C:
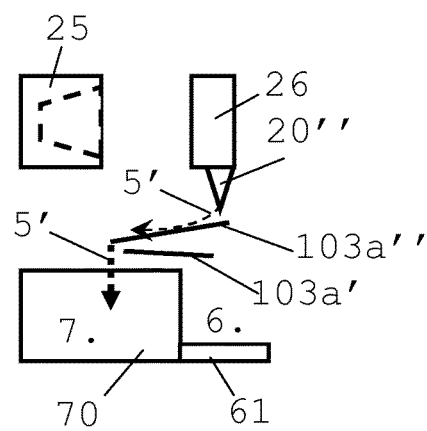

FIGS. 1 to 7 illustrate a first non-limiting embodiment of a machine for dispensing a beverage 5 according to the invention. For instance, the machine is arranged for preparing and dispensing tea and/or coffee or other beverages including liquid food such as soup. A second and a third embodiment of beverage dispensing machines according to the invention are schematically illustrated in FIGS. 8a and 8b as well as in FIGS. 9a and 9b, in which the same numeric references generally designate the same elements. FIGS. 10a and 10b, in which the same numeric references generally designate the same elements, schematically illustrate a fourth embodiment of a machine according to the invention. A fifth embodiment of a machine according to the invention is schematically illustrated in FIGS. 11a to 11c in which the same numeric references generally designate the same elements.

Unless indicated otherwise, the description below applies to all four embodiments.

Figure 1:
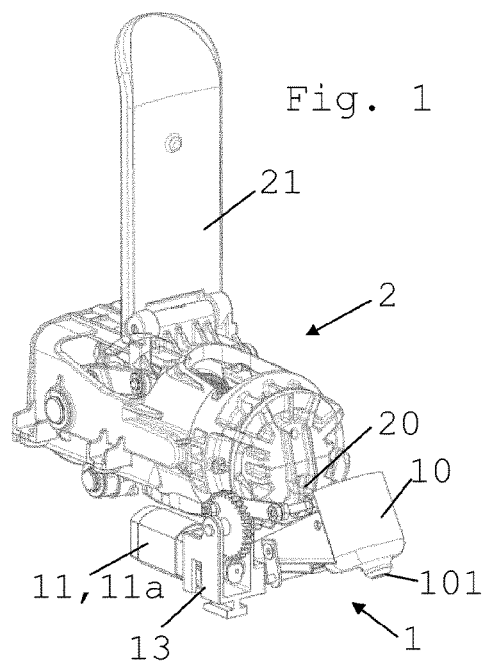
FIGS. 1 and 1a are perspective and cross-sectional views of part of a beverage preparation machine according to the invention, the machine having a processing module in a transfer configuration and a drop collector with a guide in a collecting position.
Figure 1A:
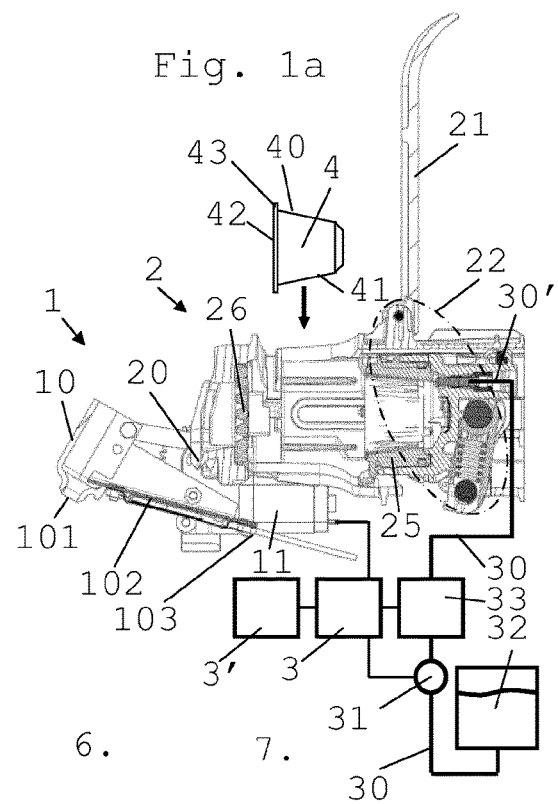
Figure 2:
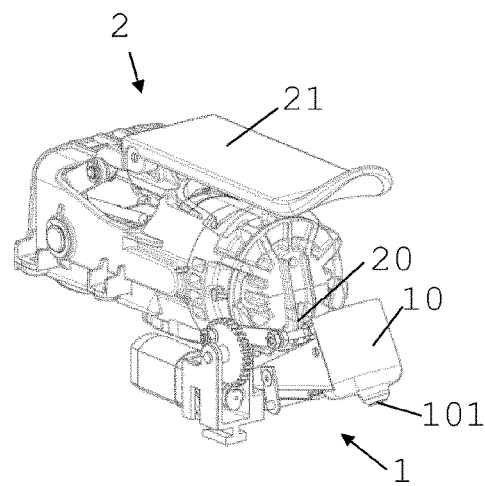
FIGS. 2 and 2a show part of the beverage machine of FIGS. 1 and 1a in which the processing module is in a processing configuration and the drop collector's guide is in its collecting position.
Figure 2A:
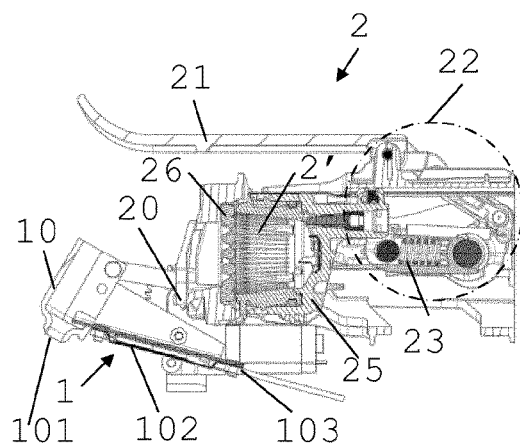

FIG. 1 illustrates a drop collector 1 and a beverage processing module 2. In addition, FIG. 1a schematically shows a fluid supply arrangement 30, 30', 31, 32, 33 and a control arrangement 3, 3'.

Beverage processing module 2 has an outlet 20, 20', 20". Furthermore, module 2 includes a first part and a second part 26 that can be relatively moved between:
- a transfer configuration (illustrated in FIG. 1a) for introducing a beverage ingredient 4, such as a capsule containing ingredient 4, between first and second parts 25, 26 and/or removing ingredient 4 from therebetween; and
- a processing configuration (illustrated in FIG. 3a) for forming beverage 5 from ingredient 4 between the first and second parts 25, 26.

The formed beverage is in principle dispensed via outlet 20, 20', 20" to a dispensing area 6, e.g. in which a user-recipient 60 such as a cup or mug or carafe is placed.

In the processing configuration, processing module 2 may form an ingredient chamber 2' for containing ingredient 4 or an ingredient holder for holding the ingredient, e.g. when the ingredient is supplied within a capsule that forms itself an ingredient chamber. Processing module 2 may form an ingredient chamber 2' for containing ingredient 4 supplied within capsule 30.

Typically, the holder or the chamber are formed by first and second parts 25, 26 in their processing configuration. For instance, first part 25 has a cavity for containing ingredient 4 and second part 26 is arranged to cover the cavity, chamber 2' being formed by covering the cavity.

For instance, capsule 40 has a container 41 covered by a lid 42, e.g. a container 41 and/or a lid 42 extending radially to form a flange 43. Such a capsule 30 is illustrated in FIG. 1a.

The machine further has a liquid driver 31 for driving a liquid, e.g. water, along a liquid line 30 from a liquid source 32 via processing module 2 to outlet 20.

Optionally, the liquid is driven via a thermal conditioner 33 such as a heater and/or a cooler. The liquid can be water. Liquid driver 31 may be a pump. Liquid source 32 can be a liquid reservoir such as a liquid tank of the machine.

Drop collector 1 has a beverage guide 10 and a motor 11, such as a rotary motor 11, 11a (FIGS. 1 to 7) or a linear motor 11b, 11b' (FIGS. 9a to 10b) or an electro-mechanical solenoid 11c (FIG. 8a) e.g. cooperating with a return spring element 11c', for moving guide 10 relatively to outlet 20, e.g. pivotally moving 104a or translationally moving 104a', 104a", into

- a dispensing position whereby beverage 5 flowing from outlet 20 is delivered to a receptacle 60 in a dispensing area 6 during a beverage serving; and
- a collecting position whereby residual beverage 5' flowing from outlet 20 is delivered to a service area 7 after a beverage serving.

Dispensing area 6 can be delimited by a receptacle support 61. Service area 7 may be delimited by a removable receptacle 70. Drop collector 1 can be arranged to divert beverage 5 flowing from outlet 20 to dispensing area 6. Drop collector 1 may be configured to divert residual beverage 5' flowing from outlet 20 to service area 7.

The machine can have a frame and/or housing (not shown) supporting drop collector 1 and beverage preparation module 2.

Figure 6:
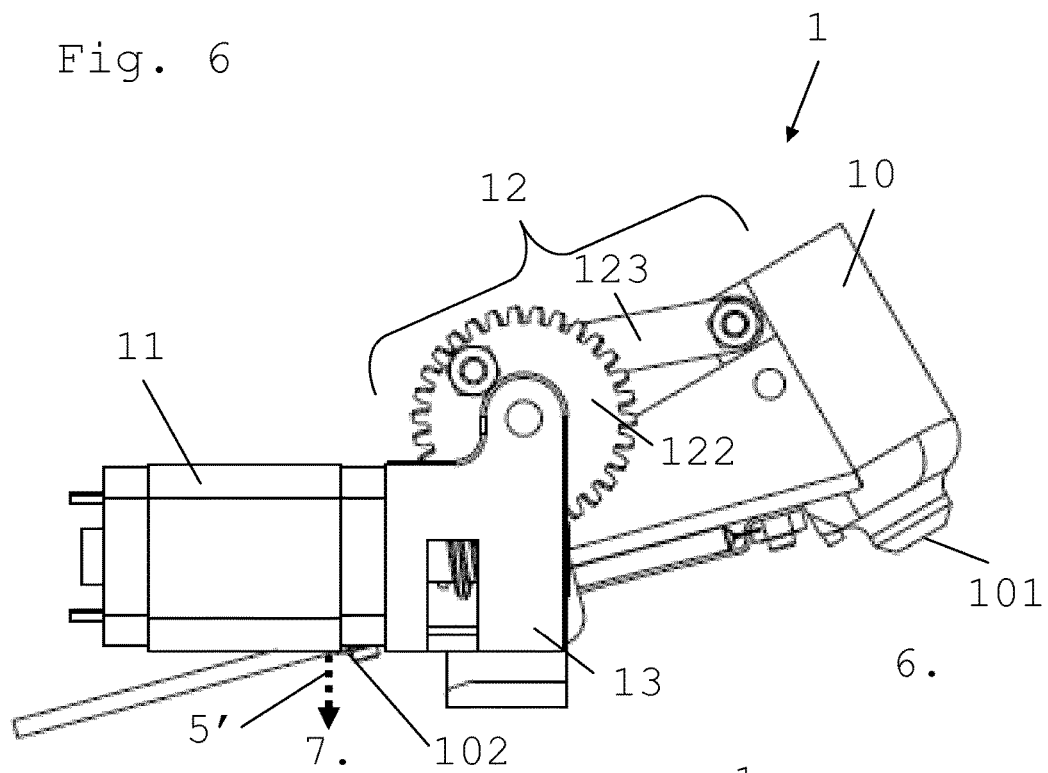
FIGS. 6 and 6a are side and perspective views of the drop collector of FIGS. 5 and 5a with the guide in its collecting position.
Figure 6A:
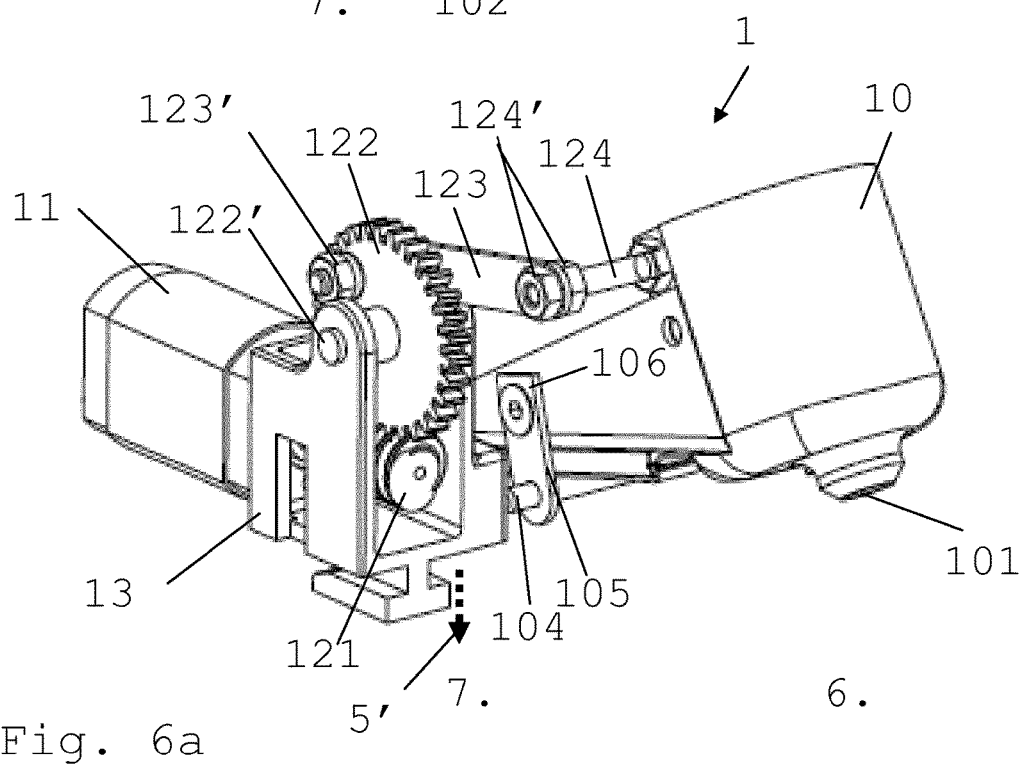
Figure 7:
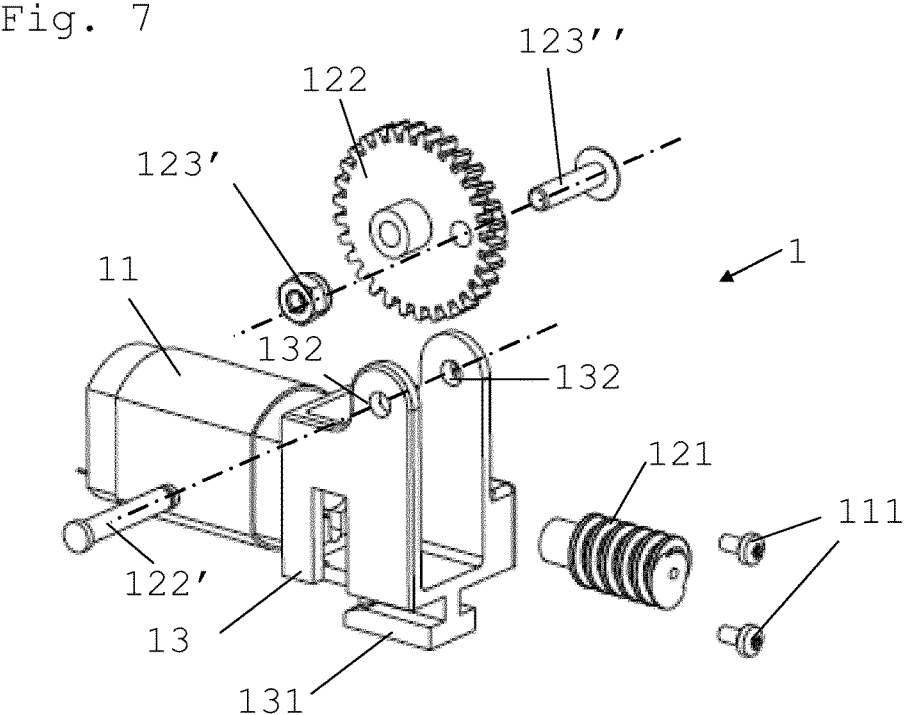
FIG. 7 is an exploded perspective view of part of the drop collector of FIGS. 5 to 6a, which part serves to hold and move the collector's guide.

As illustrated in FIGS. 6a and 7, drop collector 1 may have a support structure 13, e.g. a structure 13 fixed to a machine's frame and/or housing, via a foot 131 or other assembly means. Motor 11 can be assembled via screws 111 to support structure 13. Motor 11 drives a worm 121 in rotation that engages a wheel 122 that is mounted to structure 13 via an axle 122' extending through structure holes 132. A connecting rod 123 is mounted on a peripheral part of wheel 122 via screw 123" and nut 123'. Connecting rod 123 actuates, under the effect of a rotation of wheel 122, beverage guide 10 via connector 124 secured to connecting rod 123 by two nuts 124'. Beverage guide 10 is movably mounted to support 13. In this particular illustration, guide 10 is pivotally mounted to support 13 via arm 105 that has one extremity 106 assembled to beverage guide 10 and another part mounted to the a pivoting axis 104 fixed to support 13.

The machine further includes: a control unit 3 for controlling liquid driver 31 and motor 11, 11a, 11b, 11b', 11c and optionally a thermal conditioner 33; and a user-interface 3' for providing user-instructions to control unit 3. Control unit 3 may include a PCB and/or a controller/CPU. User-interface 3' may include one or more buttons and/or touch screens.

Processing module 2 includes a module actuator 21 for driving first and second parts 25, 26 from the transfer configuration to the processing configuration and vice-versa. Actuator 21 is independent of motor 11, 11a, 11b, 11b', 11c.

Control unit 3 is arranged to activate liquid driver and motor 11, 11a, 11b, 11b', 11c upon receiving a user-instruction from user-interface 32 independently of a presence or an absence of a receptacle in dispensing area 6. Control unit 3 is arranged to activate liquid driver and motor 11, 11a, 11b, 11b', 11c independently of the configuration (the processing configuration or transfer configuration or an intermediate configuration) of processing module 2.

Control unit 3 may be arranged to activate liquid driver 31 and motor 11, 11a, 11b, 11b', 11c only when processing module 2 is in the processing configuration.

Control unit 3 can be configured to simultaneously or within a time span of less than 5 sec., such as less than 3 sec.:
- activate liquid driver 31 and motor 11, 11a, 11b, 11b', 11c to relatively move beverage guide 10, 10', 10", 10''' into the dispensing position, such as activate motor 11, 11a, 11b, 11b', 11c prior to activating liquid driver 31; and/or
- deactivate liquid driver 31 and activate motor 11, 11a, 11b, 11b', 11c to relatively move beverage guide 10, 10', 10", 10''' into the collecting position, such as deactivate liquid driver 31 prior to activating motor 11, 11a, 11b, 11b', 11c.

Beverage guide 10, 10', 10", 10''' can be provided with a thermal conditioner 33' such as a cooler or a heater, e.g. a thick film, discrete resistor or cartridge heater, for instance a thermal conditioner 33' controlled by control unit 3. Thermal conditioner 33' can be configured to adjust a temperature of beverage 5 when delivered to dispensing area 6. Such a thermal conditioner 33' is illustrated in FIG. 8a.

Control unit 3 can be configured to deactivate liquid driver 31 and activate motor 11, 11a, 11b, 11b', 11c to relatively move beverage guide 10, 10', 10", 10''' into the collecting position at:
- user-actuation of user-interface 32 or user-actuation of module actuator 21, while liquid driver 31 is active; or
- at expiry of a predetermined period of time after user-actuation of user-interface 32 for activation of liquid driver 31.

Module actuator 21 can be semi-automatic, such as a module actuator comprising an energy buffer, e.g. a spring 23, that is loaded in one direction and unloaded in an opposite direction when first and second parts 25, 26 are relatively driven between the transfer configuration and the processing configuration.

Module actuator 21 can be fully automatic, such as a module actuator comprising an energy converter, for instance a converter into mechanical energy of electric and/or hydraulic energy such as an electric motor and/or a hydraulic actuator e.g. powered via the liquid driver. Module actuator 21 may be controlled by control unit 3.

Module actuator 21 can be manual. For instance, module actuator comprises a handle 21, e.g. a pivotable and/or a translatable handle, that can be driven manually by a user. Optionally, actuator 21 drives first part 25 and/or second part 26 via a transmission 22, such as a transmission comprising a gear arrangement and/or a lever arrangement, e.g. a transmission 22 that is assisted by an automatic return spring 23.

Beverage guide 10, 10', 10", 10''' can have at least one directing surface 103; 103', 103"; 103a', 103a" for collecting beverage 5, 5' from outlet 20 either to service area 7 or to dispensing area 6. The directing surface may be formed of:
- a single ramp 103 such as a ramp pivotable 103a relative to the outlet 20 (FIGS. 1 to 8b); or
- at least two joined ramps 103', 103" such as ramps translatable 103', 103" relatively to outlet 20 (FIGS. 9a to 10b); or
- at least two spaced apart ramps 103a', 103a", such as a dispensing ramp 103a' and a collecting ramp 103a", e.g. a collecting ramp 103" relatively movable to dispensing ramp 103a' and outlet 20", for instance movable by translation and/or rotation (FIGS. 11a to 11c).

For instance, beverage guide 10 delimits a first passage 101 for guiding beverage 5 over dispensing area 6 and a second passage 102 for guiding residual beverage 5' over a service area 7. Passage 101,102 may be in the form of a hole or an edge of directing surface 103.

Beverage guide 10, 10', 10", 10''' may be moved by motor 11, 11a, 11b, 11b' via a transmission 12. Such a transmission 12 may include:
- a gear arrangement 121, 123 such as a toothed gear arrangement 121, 123, e.g. an arrangement comprising at least one of a wheel 122, pinion, rack and worm gear 121; and/or
- one or more connecting rods 123, such as a connecting rod 123 driving or driven by a wheel 122 and/or a pair of connecting rods forming a knuckle joint.

Outlet 20 can be fixed, at least part 103; 103', 103" of beverage guide 10, 10' being movable relative to fixed outlet 20 (FIGS. 1 to 9b). For instance, outlet 20 extends from a fixed part 26 of beverage processing module 2.

Outlet 20', 20" can be movably arranged, optionally at least a part 103a" of beverage guide 10''' may be movably arranged (FIGS. 11a to 11c) or the beverage guide being fixed (FIGS. 10a and 10b). For instance, outlet 20' with first and second parts 25, 26 are moved in the machine over beverage guide 20' (FIGS. 10a and 10b), or outlet 20" extends from a movable part 26 of beverage processing module 2 and guide 10''' is operative independently of whether processing module 2 is in the transfer configuration or in the dispensing configuration (FIGS. 11a to 11c).

At least a part 103 of beverage guide 10 can be pivotable relatively to outlet 20, e.g. pivotable about a generally horizontal axis 104a (FIGS. 1 to 8b). Typically beverage guide 10 is pivotable in the machine.

At least a part 103', 103", 103a', 103a" of beverage guide 10', 10", 10''' may be translatable relatively to outlet 20, 20", e.g. translatable along a generally horizontal axis 104a', 104a" (FIGS. 9a to 11c).

For instance, beverage guide 10' is translatable and outlet 20 is fixed (FIGS. 9a and 9b), or beverage guide 10" is fixed and outlet 20' is translatable, in particular first and second parts 25, 26, is translatable (FIGS. 10a and 10b), or at least a part 103a" of beverage guide 10''' is movable and outlet 20" is movable (FIGS. 11a to 11c).

The invention claimed is:

1. A machine for dispensing a beverage, the machine comprising:
   a beverage processing module that has an outlet as well as a first part and a second part that can be relatively moved between (i) a transfer configuration for introducing a beverage ingredient and (ii) a processing configuration for forming the beverage from the ingredient between the first and second parts;
   a liquid driver for driving a liquid along a liquid line from a liquid source;
   a drop collector having a beverage guide and a motor for moving the beverage guide relatively to the outlet into (a) a dispensing position whereby the beverage flowing from the outlet is delivered to a receptacle in a dispensing area during a beverage serving and (b) a collecting position whereby a residual beverage flowing from the outlet is delivered to a service area after the beverage serving;
   a control unit for controlling the liquid driver and the motor; and
   a user-interface for providing a user-instruction to the control unit,
   the beverage processing module comprising a module actuator for driving the first and second parts from the transfer configuration to the processing configuration and vice-versa, the module actuator being independent of the motor,
   the control unit is arranged to activate the liquid driver and the motor upon receiving the user-instruction from the user-interface independently of a presence or an absence of a receptacle in the dispensing area.

2. The machine of claim 1, wherein the control unit is arranged to activate the liquid driver and the motor independently of whether the beverage processing module is in the transfer configuration or the processing configuration.

3. The machine of claim 1, wherein the control unit is arranged to activate the liquid driver and the motor only when the beverage processing module is in the processing configuration.

4. The machine of claim 1, wherein the control unit is configured to simultaneously or within a time span of less than 5 sec.
   activate the liquid driver and the motor to relatively move the beverage guide into the dispensing position; and/or
   deactivate the liquid driver and activate the motor to relatively move the beverage guide into the collecting position.

5. The machine of claim 1, wherein the beverage guide is provided with a thermal conditioner.

6. The machine of claim 1, wherein the control unit is configured to deactivate the liquid driver and activate the motor to relatively move the beverage guide into the collecting position at user-actuation of the user-interface or user-actuation of the module actuator, while the liquid driver is active; or at expiry of a predetermined period of time after the user-actuation of the user-interface for activation of the liquid driver.

7. The machine of claim 1, wherein the module actuator is semi-automatic or fully automatic.

8. The machine of claim 1, wherein the module actuator is manual.

9. The machine of claim 1, wherein the beverage guide has at least one directing surface for collecting the beverage from the outlet either to the service area or to the dispensing area.

10. The machine of claim 1, wherein the beverage guide is moved by the motor via a transmission.

11. The machine of claim 1, wherein the outlet is fixed, at least a part of the beverage guide being movable relative to the outlet, and the outlet extending from a fixed part of the beverage processing module.

12. The machine of claim 1, wherein the outlet is a movably arrangement.

13. The machine of claim 1, wherein at least a part of the beverage guide is pivotable relatively to the outlet.

14. The machine of claim 1, wherein at least a part of the beverage guide is translatable relatively to the outlet.

15. The machine of claim 1, wherein the beverage guide and the outlet have a configuration selected from the group consisting of (1) the beverage guide is movable and the outlet is fixed; (2) the beverage guide is fixed and the outlet is movable; and (3) the beverage guide is movable and the outlet is movable.

16. The machine of claim 1, wherein the module actuator comprises a handle configured to be driven manually by a user.

17. The machine of claim 16, wherein the handle is pivotable and/or translatable.

18. The machine of claim 1, wherein at least a part of the beverage guide is translatable along a generally horizontal axis.

* * * * *